(12) United States Patent
Krähenbühl et al.

(10) Patent No.: US 8,360,659 B2
(45) Date of Patent: Jan. 29, 2013

(54) FIBER-OPTIC PIN-AND-SOCKET CONNECTOR HAVING A BEAM EXPANSION DEVICE

(75) Inventors: Roger Krähenbühl, Herisau (CH); Thomas Ammer, Widnau (CH)

(73) Assignee: Huber+Suhner AG, Herisau (CH)

( * ) Notice: Subject to any disclaimer, the term of this patent is extended or adjusted under 35 U.S.C. 154(b) by 168 days.

(21) Appl. No.: 12/733,459

(22) PCT Filed: Aug. 19, 2008

(86) PCT No.: PCT/EP2008/006799
§ 371 (c)(1), (2), (4) Date: Jul. 7, 2010

(87) PCT Pub. No.: WO2009/030360
PCT Pub. Date: Mar. 12, 2009

(65) Prior Publication Data
US 2010/0284651 A1    Nov. 11, 2010

(30) Foreign Application Priority Data

Aug. 30, 2007   (CH) ..................... 1362/07

(51) Int. Cl.
*G02B 6/36* (2006.01)
*G02B 6/40* (2006.01)

(52) U.S. Cl. ............. 385/53; 385/55; 385/59; 385/71
(58) Field of Classification Search ............ 385/53, 385/54, 55, 59, 71
See application file for complete search history.

(56) References Cited

U.S. PATENT DOCUMENTS

| | | | |
|---|---|---|---|
| 5,768,458 A | | 6/1998 | Ro et al. |
| 6,000,857 A | * | 12/1999 | Rondeau ............ 385/84 |
| 6,012,852 A | | 1/2000 | Kadar-Kallen et al. |
| 2003/0002805 A1 | | 1/2003 | Trezza et al. |

FOREIGN PATENT DOCUMENTS

| | | |
|---|---|---|
| DE | 100 43 985 A1 | 3/2002 |
| EP | 0 997 757 A2 | 6/2000 |
| EP | 1 341 015 A1 | 9/2003 |
| EP | 1 459 865 A | 9/2004 |
| JP | 2007 041222 | 2/2007 |
| WO | WO 02/056060 A | 7/2002 |
| WO | WO 2006/098734 | 9/2006 |

OTHER PUBLICATIONS

T. Ammer et al., "Fibres and Optical Passive Components," Novel, IEEE/LEOS Workshop, Jun. 22-24, 2005, pp. 339-344.

* cited by examiner

*Primary Examiner* — Brian Healy
*Assistant Examiner* — Mary El Shammaa
(74) *Attorney, Agent, or Firm* — Pauley Petersen & Erickson

(57) ABSTRACT

The invention relates to an optical pin-and-socket connector for the detachable connection of a plurality of optical cores (115) having an insert (112, 112'), in which the cores (115) are inserted on a first side, the cores (115) ending in said connector with the optical fibers (119, 120) thereof, and said connector having an expansion device (117, 118) on a second side, on which the beams exit the fibers (119, 120) in an expanded manner. A simplification of the assembly and installation is achieved in that the insert (112, 112') comprises two separate partial elements (113, 117, 118) that can be assembled, one of which is configured as an expansion device (117, 118) and the other is configured as a retaining block (113) for receiving the ends of the optical cores (115).

17 Claims, 6 Drawing Sheets

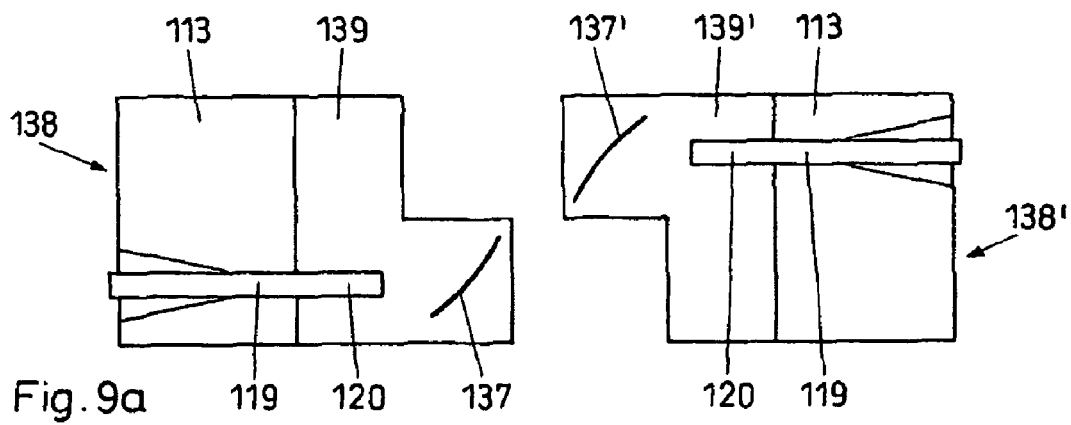
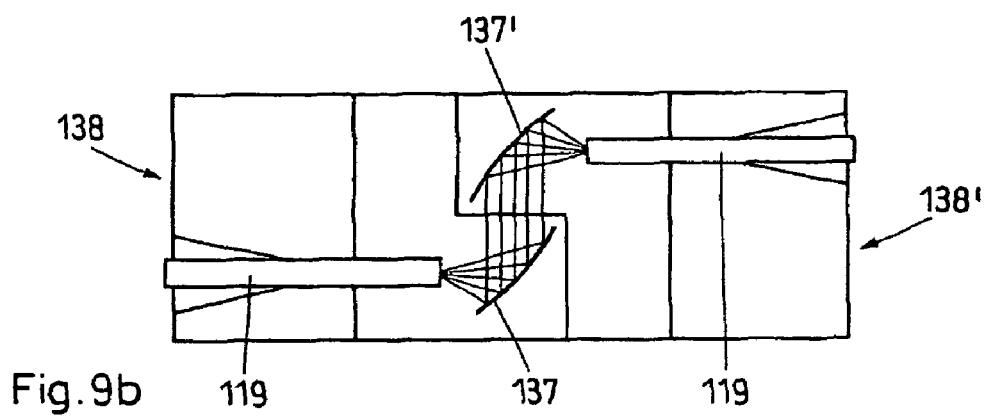
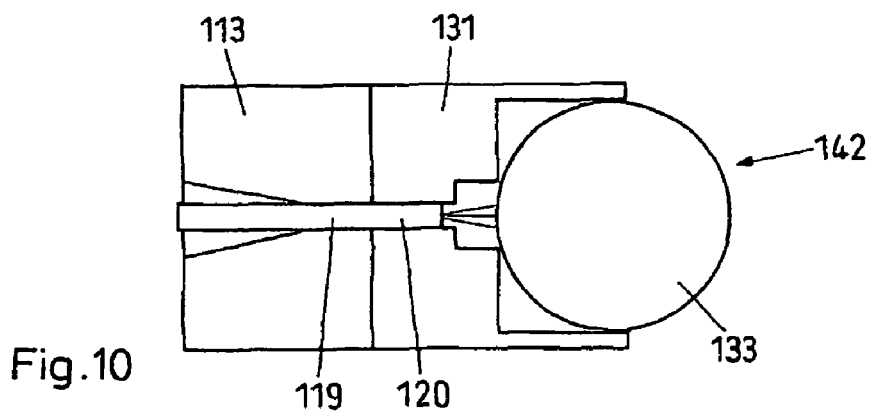

FIBER-OPTIC PIN-AND-SOCKET CONNECTOR HAVING A BEAM EXPANSION DEVICE

BACKGROUND OF THE INVENTION

1. Field of the Invention

The present invention relates to the field of optical telecommunications. It relates in particular to an optical plug connector as claimed in the precharacterizing clause of claim 1.

2. Discussion of Related Art

Because of their wide bandwidth and insensitivity to electromagnetic interference fields, optical fiber networks are being used increasingly in all fields for data transmission. In this case, plug connectors are used for detachable connection between different cables and their cores, which plug connectors are arranged at the cable ends or core ends and, in the mated state, reliably input the light signals which emerge from the fiber ends on one side of the connector into the fiber ends on the other side of the connector.

As the complexity of transmission networks increases and the appliances that are used are increasingly miniaturized, the packing density of the plug connections is becoming ever more important. With standardized individual plugs of the LC, SC, ST type or the like, the achievable densities are essentially governed and limited by the comparatively large plug housings. A certain amount of compression can be achieved by the combination of individual plugs in pairs to form duplex plugs (see for example EP-A1-1 341 015). Other plug connector systems of the MT type admittedly achieve higher densities by using a common ferrule for a plurality of fibers, but they are restricted to optical cables in the form of ribbons, and are not suitable for the common plug connection between individual cores (see for example EP-A2-0 997 757 or WO-A1-2006098734).

In particular, plug connector systems such as these require direct contact between the end surfaces of the individual fibers which are fixed in the ferrules, and this necessitates accurate processing of the fiber ends which are flush with the ferrules, by various types of grinding processes, and precise orientation of the fiber ends during installation into the plug connectors and during mutual alignment in the inserted state.

On the other hand, it is known for optical means such as lenses to be used at the fiber ends in plug connector systems, in order to widen the beam emerging from the fiber ends and to make it parallel, thus making the requirements for mutual alignment of the fibers to be connected less stringent. Plug connector systems such as these are known for individual fibers, for example, from U.S. Pat. No. 5,768,458 A1 or for a plurality of fibers from JP-A-2007041222. It is also possible to use specially shaped mirror elements (DE-A1-100 43 985) instead of lenses.

However, with plug connector systems such as these, the fabrication of the fiber ends, as well as their alignment and fixing with respect to the beam-widening optical means or elements, are complex and problematic.

SUMMARY OF THE INVENTION

The object of the present invention is therefore to provide an optical plug connector and an optical plug connector system which allow high connector densities, are of simple design and are distinguished by simplified fabrication of the cable and core ends, and to specify a method for their production.

The object is achieved by the totality of features of claims 1, 12 and 14. One essential feature for the optical plug connector according to the invention is an insert into which the cores of a cable to be connected are inserted on a first side, and in which the cores end with their optical fibers. This insert has a widening apparatus on a second side, on which the beams emerge widened from the fibers. The insert comprises two separate partial elements which can be joined together, one of which is in the form of a widening apparatus and the other is in the form of a holding block for holding the ends of the cores. This advantageously makes it possible to still process the fiber ends with comparatively few restrictions when the core ends are already held by the holding block.

The holding block and the widening apparatus are preferably designed and matched to one another such that, when the insert is joined together, the fibers of the core ends which are held by the holding block have a fiber section of predetermined length which projects out of the holding block and into the widening apparatus. The fiber ends are therefore freely accessible and can be processed precisely and quickly by means of a laser method.

The core ends can be held particularly easily if the holding block has a core hole for each of the core ends, which core hole extends into the holding block on the first side and merges via an adjacent insertion cone into a fiber hole which ends on the opposite side of the holding block.

In this case, it is advantageous for the connection density if the core holes or fiber holes are arranged parallel to one another and in a plurality of rows one above the other in the holding block. A checkerboard-like or very densely packed arrangement, or some other suitable arrangement of the holes, can be provided in this case.

Another refinement of the optical plug connector according to the invention is characterized in that the widening apparatus has first means for widening the beams which emerge from the cores, and has second means for holding and adjusting the fiber sections which project out of the holding block with respect to the first means, wherein either the first means comprise refractive optical elements, in particular in the form of lenses, spherical lenses or GRIN lenses, or comprise reflective optical elements, in particular in the form of mirrors or parabolic mirrors.

According to a further refinement of the invention, the second means comprise adjusting holes or V-grooves.

Another refinement is distinguished in that the end surfaces of the fiber sections which project out of the holding block are laser-processed, wherein a process which is known as laser cleaving is preferably used for this purpose.

The insert is preferably fitted into a housing.

In the method according to the invention, in a first step, the optical fibers are exposed over a predetermined length at the core ends which are associated with the plug connector, before, in a second step, the core ends with the exposed fibers are inserted into the holding block and are fixed there, such that a fiber section of each of the exposed fibers projects out of the holding block, in a third step, the projecting fiber sections are processed by a laser cleaving process, in a fourth step, the holding block with the core ends held in it is joined to a widening apparatus that is provided to form an insert, and finally the insert is fitted into a housing.

One preferred refinement of the method according to the invention is distinguished in that a widening apparatus is used which comprises optical means for widening the beams which emerge from the cores, and in that the exposed fiber sections are adjusted with respect to the optical means when the holding block and the widening apparatus are being joined together.

The optical plug connector system according to the invention comprises two optical plug connectors which are matched to one another and can be detachably connected to one another, wherein the two plug connectors are designed according to the invention.

The inserts of the two plug connectors are preferably of the same type.

It is also advantageous if the inserts of the two assembled plug connectors are aligned with one another with respect to the optical axes, and are at a distance from one another.

In particular, the plug connectors can be latched to one another by a screw connection, a bayonet fitting or a sprung quick-action catch, wherein the plug connectors can preferably be latched to one another forming a seal.

BRIEF DESCRIPTION OF THE DRAWINGS

The invention will be explained in more detail in the following text with reference to exemplary embodiments and in conjunction with the drawing, in which:

FIG. 8b shows a longitudinal section through an insert having the widening apparatus as shown in FIG. 8a;

FIG. 9a shows an exemplary embodiment, which is comparable to FIG. 8, with only one mirror per insert and plug connector;

FIG. 9b shows the optical coupling between the inserts of two plug connectors from FIG. 9a in the mated state;

FIG. 10 shows a longitudinal section through an insert having an alternative widening apparatus to that in FIG. 8 with spherical lenses;

DETAILED DESCRIPTION OF THE INVENTION

Figure 1:
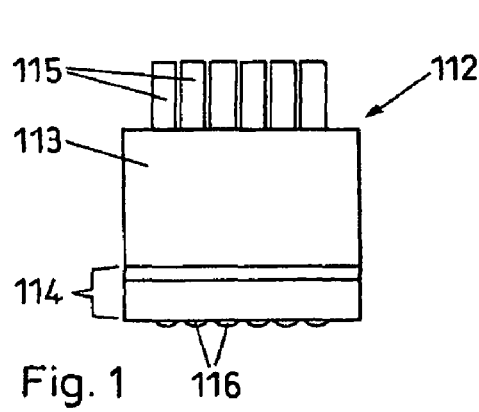
FIG. 1 shows a top view of one exemplary embodiment of an insert according to the invention.
Figure 2:
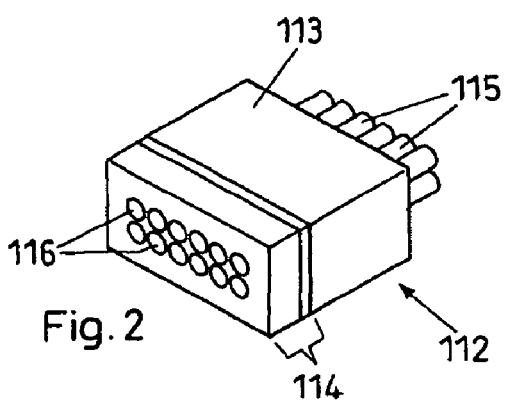
FIG. 2 shows a side perspective view of one exemplary embodiment of an insert according to the invention.
Figure 3:
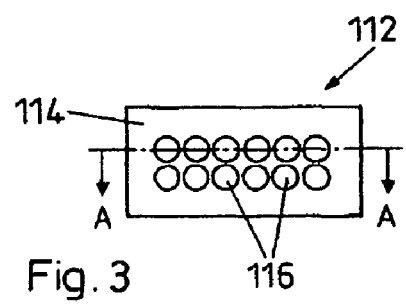
FIG. 3 shows a front perspective view of one exemplary embodiment of an insert according to the invention.
Figure 4:
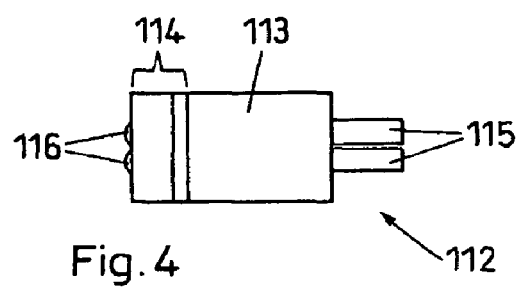
FIG. 4 shows a side perspective view of one exemplary embodiment of an insert according to the invention.
Figure 5:
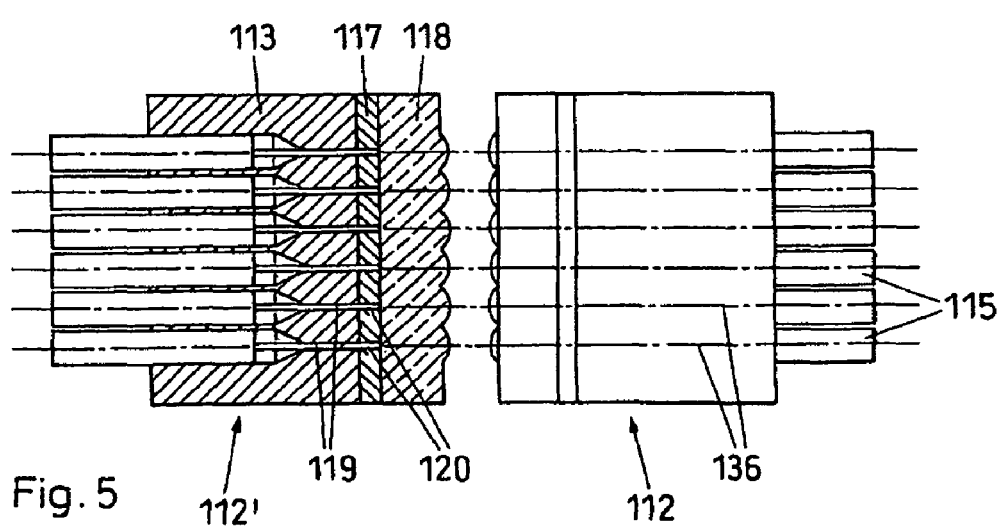
FIG. 5 shows the arrangement of two inserts as shown in FIGS. 1-4 within a plug connector system.
Figure 11:
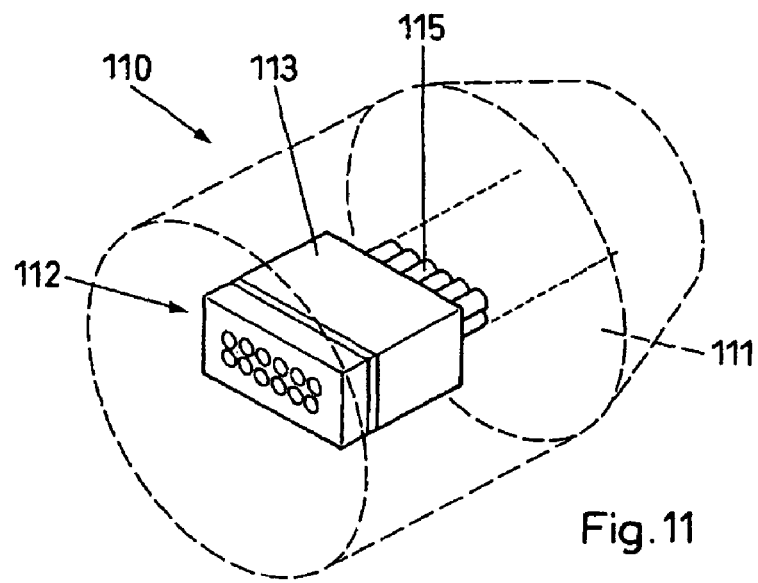
FIG. 11 shows a highly schematic illustration of an example of the fitting of the insert as shown in FIGS. 1-4 into a plug connector.
Figure 12:
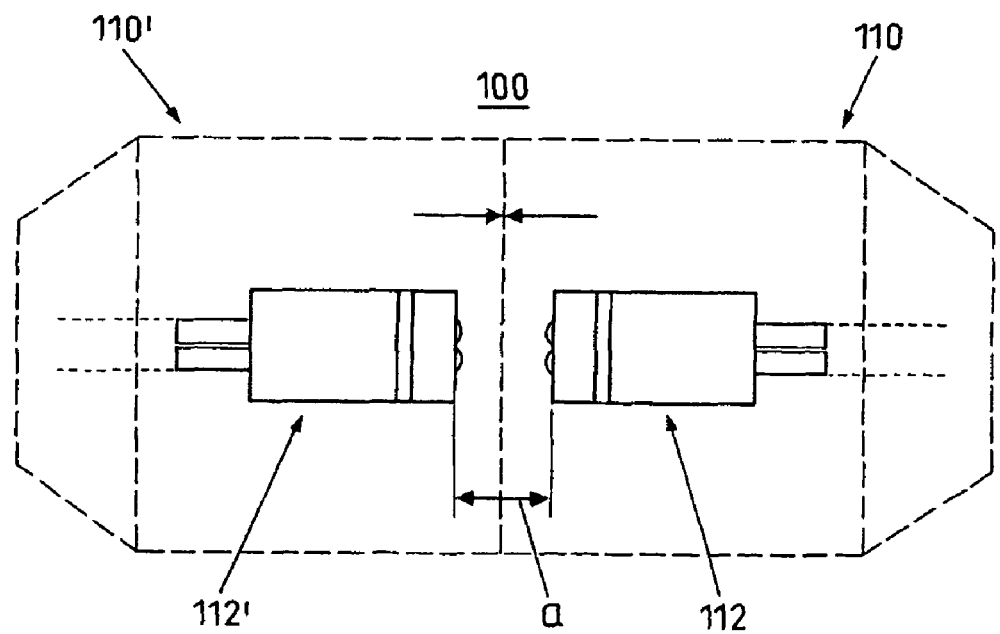
FIG. 12 shows a highly schematic illustration of a plug connector system having two mated plug connectors as shown in FIG. 11.
Figure 13:
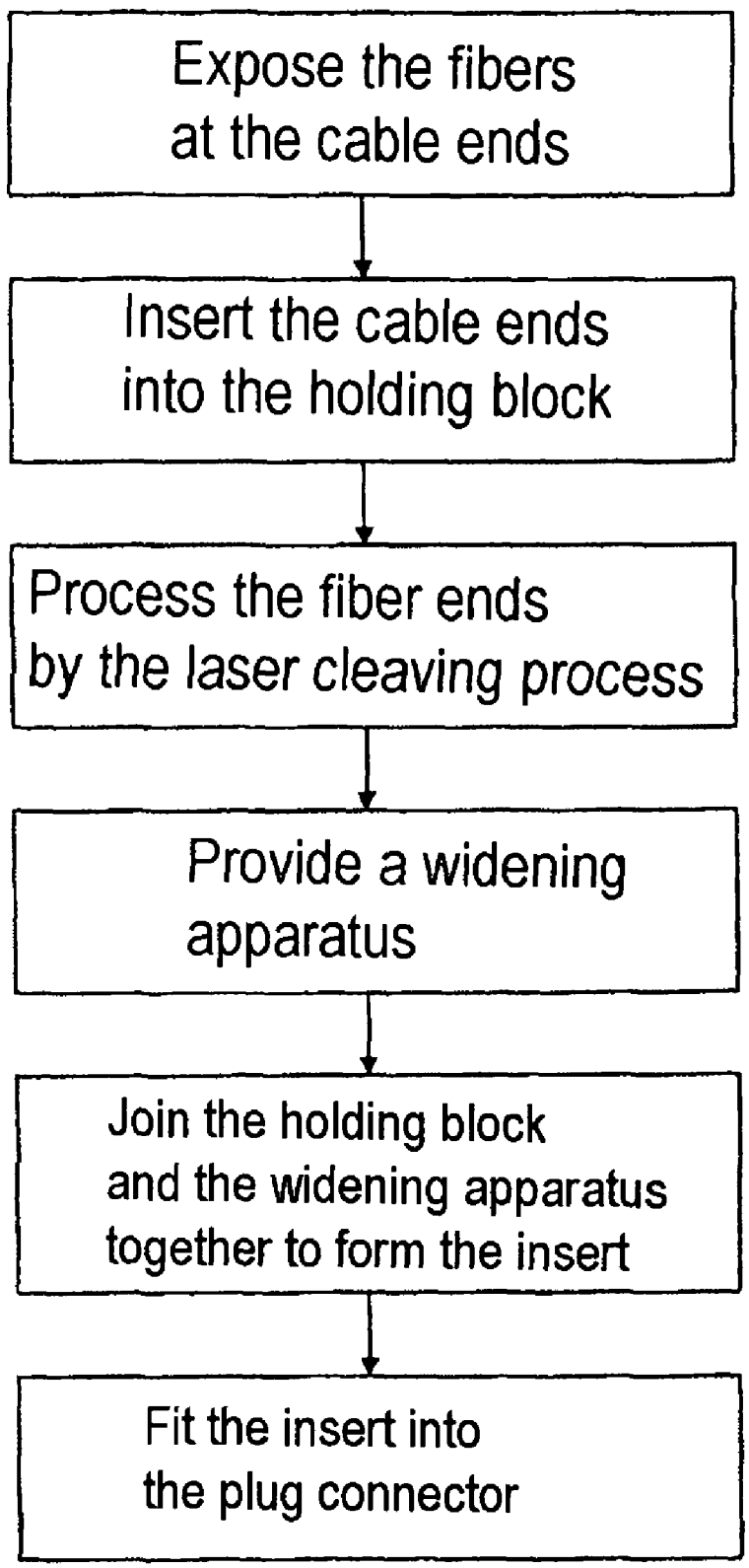
FIG. 13 shows various steps for the production of a plug connector according to the invention.

FIG. 11 shows a highly schematic illustration of a plug connector 110 according to one exemplary embodiment of the invention. A plurality of optical cores 115 end in an insert 112 within the plug connector 110, which insert 112 is fitted into a housing 111 and designed as shown in FIGS. 1-7. By way of example, two plug connectors 110 and 110' of the same type are plugged together in the plug connector system 100 illustrated in FIG. 12, with their inserts 112, 112' being aligned with one another on the optical axes 136 as shown in FIG. 5, and being at a distance a from one another, across which the two inserts 112, 112' interchange beams.

Figure 6:
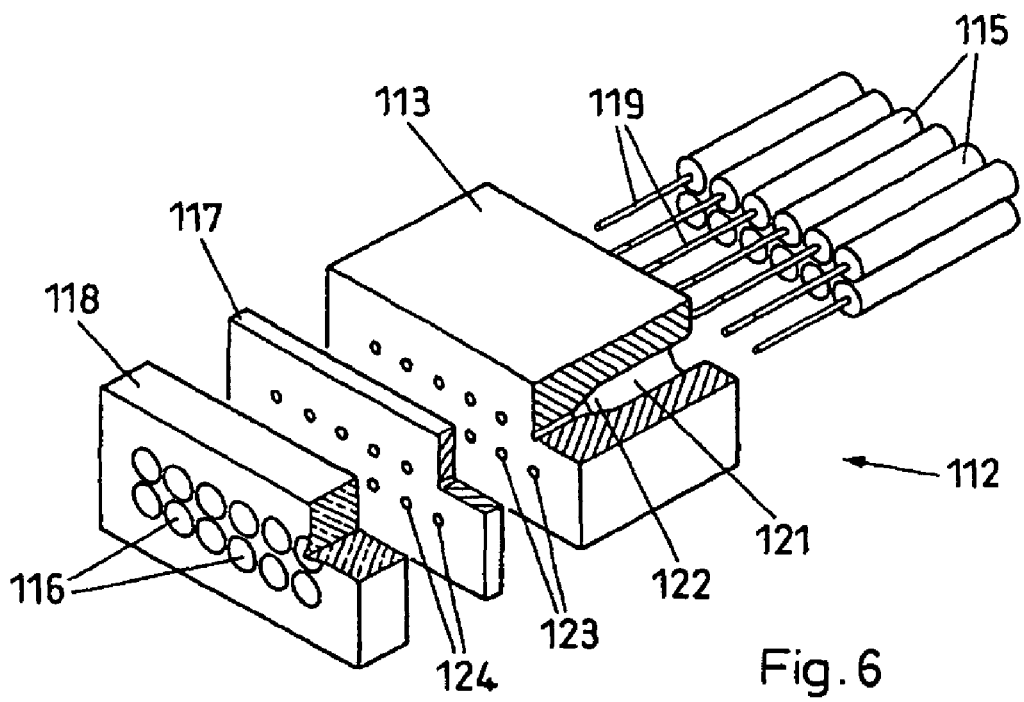
FIG. 6 shows a perspective exploded illustration of the various partial elements of the insert as shown in FIGS. 1-4.
Figure 7:
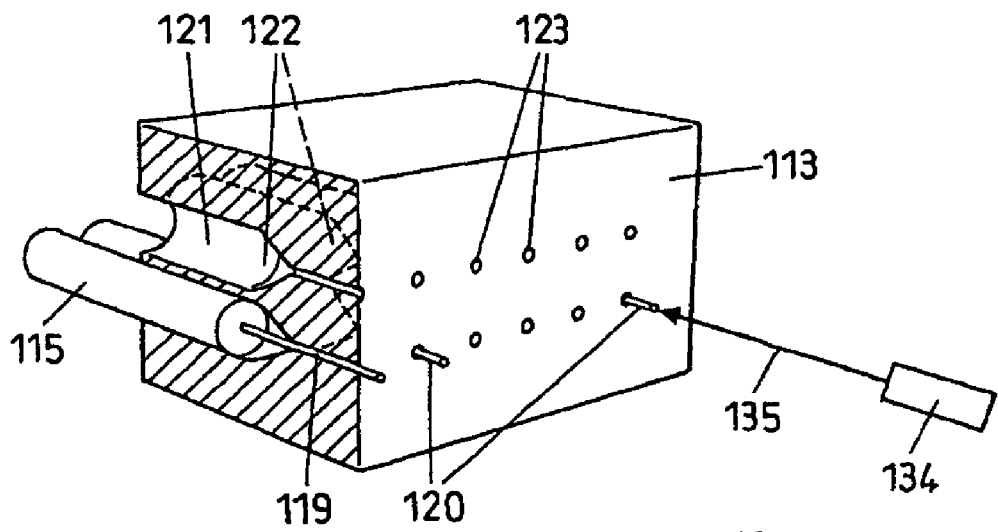
FIG. 7 shows the holding block for the insert from FIGS. 1-4 with the projecting fiber sections which are accessible for processing.

As can be seen in particular from FIG. 6, the insert 112 in this exemplary embodiment comprises a plurality of partial elements, specifically a holding block 113, an adjusting apparatus 117 and an optical widening block 118. The adjusting apparatus 117 and the optical widening block 118 together form a widening apparatus 114 (FIGS. 1-4) whose purpose is to widen the beams emerging from the core ends 115, for inputting into the complementary plug connector. The holding block 113 holds the ends of the cores 115 with the fibers 119 exposed over a distance, and mechanically fixes them. For this purpose, preferably parallel arrangements in two rows one above the other in each case comprising a core hole 121, an insertion cone 122 and a fiber hole 123 are provided in the holding block 113, are arranged one behind the other in the insertion direction of the core 115, and hold the cores 115 and the fibers 119 in the manner illustrated in FIG. 5.

In this exemplary embodiment, the adjusting apparatus 117 is a plate of constant thickness, which has adjusting holes 124 in the form of precise microholes at the points which correspond to the fiber holes 123, in which adjusting holes 124 the fibers 119 whose fiber sections 120 project out of the holding block 113 (see FIG. 7) are guided precisely by these fiber sections 120.

In this example, the widening block 118 is an integral block composed of glass or some other transparent material, on whose outside beam-widening optical elements in the form of convex lenses 116 are formed, which form a two-row arrangement corresponding to the holes 121, 123 and 124 and, when the insert 113 has been joined together, correspond with the adjusting holes 124 with respect to the optical axis. However, the widening block 118 may also be joined to the adjusting apparatus 117 to form a micromechanically processed unit.

During the fabrication process, the fibers 119 are first of all exposed over a certain length on the individual cores 115. The core ends 115 with the exposed fibers 119 are then inserted into the appropriate holes 121, 123 in the holding block 113, until this results in the configuration illustrated in FIG. 7, in which the fiber sections 120 of the fibers 119 project freely out of the opposite side of the holding block 113. In this case, the insertion cones 122 make it easier to insert the fibers 119 into the fiber holes 123. The fiber sections 120, which project out of the fiber holes 123, are now freely accessible for processing, preferably laser processing (laser cleaving) by means of a laser beam 135 which originates from a laser 134, during which process the length of the fiber section 120 and the end surface of the fiber are processed optically precisely. Details relating to the process of laser cleaving can be found in the following publication: Ammer, T.; Strasser, M. M.; Studer, H.; Zaina, P.; Compare, C., Novel small form factor optical ribbon fiber connector for singlemode applications, Fibres and Optical Passive Components, 2005. Proceedings of 2005 IEEE/LEOS Workshop on 22-24 Jun. 2005 page(s): 339-344.

The arrangement comprising the cores 115 and holding block 113 that has been processed in this way is now joined to the widening apparatus 114 that is provided, with the exposed fiber sections 120 entering the adjusting holes 124 in the adjusting apparatus 117 as shown in FIG. 5 and with the end surface of said fiber sections abutting to a greater or lesser extent on the widening block 118. During operation, the beams emerge from the fiber ends and enter the widening block 118, which they leave—widened by the optical widening elements 116—on the opposite side. They are focused again in the opposite manner in the mating plug of the same type, and are input into the fiber ends. This allows coupling between the plug connectors, requiring neither direct mechanical contact between the front faces of the plug connectors nor high-precision alignment of the optical axes.

Figure 8A:
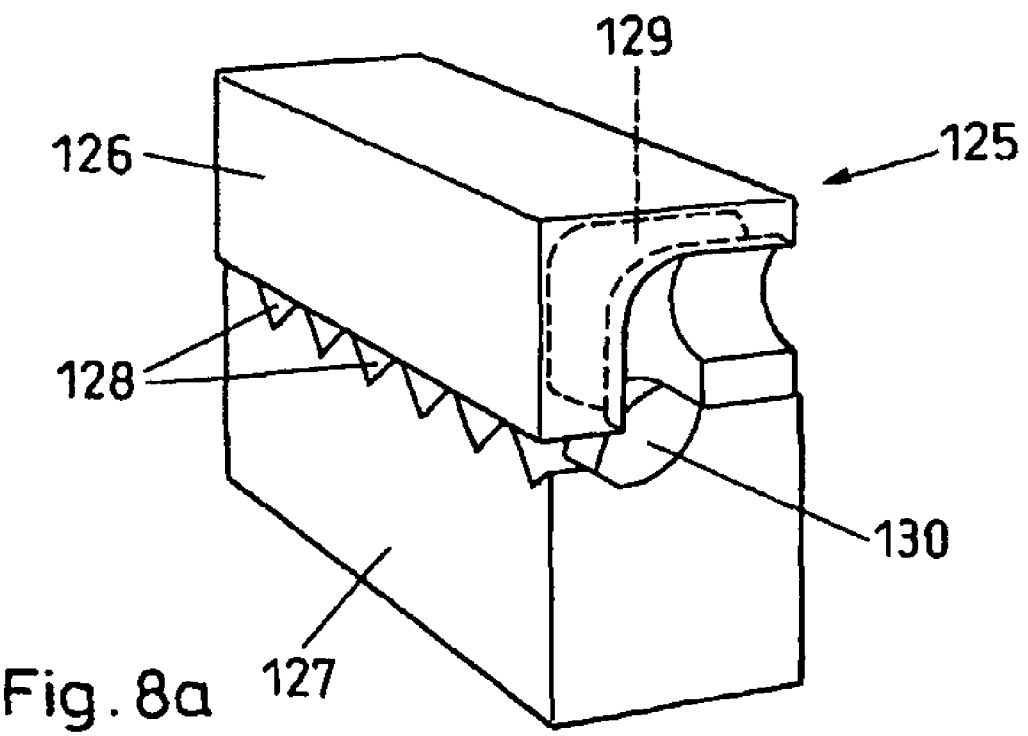
FIG. 8a shows a widening apparatus, as an alternative to the exemplary embodiment shown in FIG. 6, with parabolic mirrors and V-grooves.
Figure 8B:
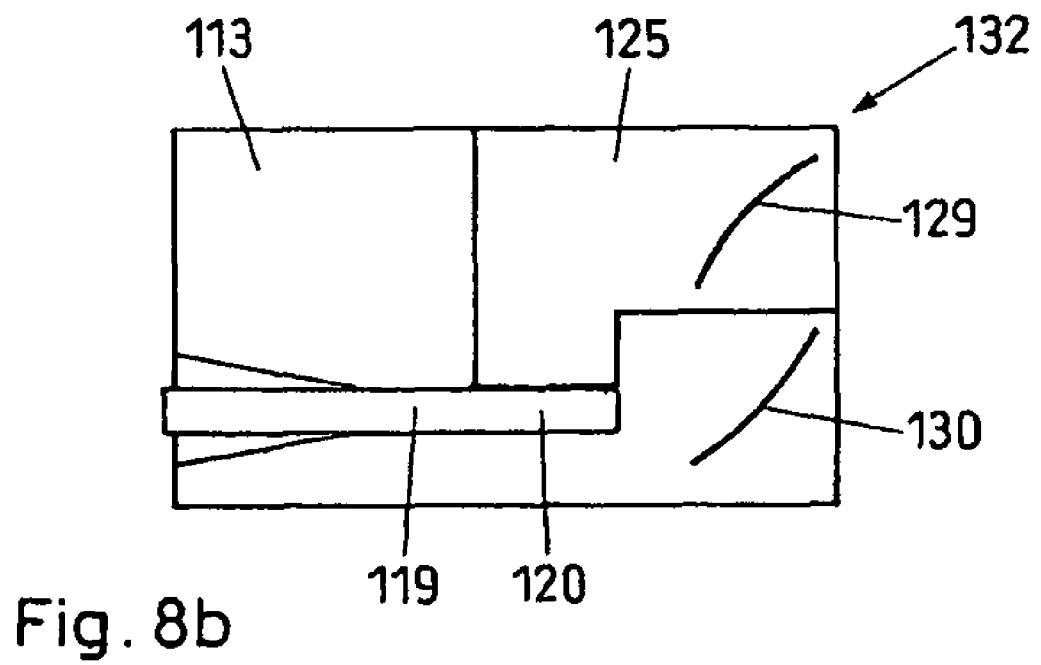

Other exemplary embodiments of widening apparatuses for the purposes of the invention are shown in FIGS. 8 to 10. FIG. 8a shows a widening apparatus 125 in which the beam coming from the fiber 119 is deflected twice via two reflective elements in the form of parabolic mirrors 129, 130, and is widened in the process. The widening apparatus 125 is in this case composed of a separate upper part 126 and a separate lower part 127, in each of which one of the parabolic mirrors 129, 130 is arranged. V-grooves 128 which match the mirror pairs 129, 130 are provided alongside one another in the lower part 127 and, interacting with the upper part 126 placed thereon, adjust the inserted fiber sections, clamping them, thus forming an integrated adjusting apparatus. Together with the holding block 113, this therefore results in the insert 132 that is illustrated schematically in FIG. 8b.

FIG. 9 shows an exemplary embodiment which is comparable to FIG. 8, wherein the sub-figure 9a shows the arrangement in the unmated state, and the sub-figure 9b shows the arrangement in the mated state. The mutually complementary inserts 138, 138' have a respective widening apparatus 139 and 139', which have only one reflective element in the form of a respective mirror 137 or 137'. The optical coupling between the two inserts 138, 138' in the mated state (FIG. 9b) takes place at right angles to the optical axis of the two optical fibers 119. The specific configuration of the widening apparatuses 139, 139' makes it possible to manage with only one injection-molded part (for the widening apparatus 139, 139'), which can be fitted on both sides of the plug connection.

FIG. 10 shows a further exemplary embodiment of a widening apparatus 131 which, together with the holding block 113, forms the insert 142. In order to widen the beam, the widening apparatus 131 in each case contains a spherical lens 133, the center point of whose sphere lies on the optical axis of the associated fiber 119. However, other types of beam-widening elements are also feasible, for example cylindrical lenses with a gradient index (GRIN) or the like.

Overall, the invention results in an optical plug connector which is distinguished by the following advantages:
  No spacers are required in the plug connection.
  No fiber block needs to be polished.
  No precautions need be taken for index matching.
  The precision requirements for the holding block are low.
  All of the fibers can be processed in one process.
  Mechanical contact is possible between the fiber ends and the widening apparatus.

The invention claimed is:

1. An optical plug connector (110, 110') for detachable connection of a plurality of optical cores (115) comprising:
  an insert (112, 112'; 132, 138, 138', 142) into which the optical strands (115) are inserted on a first side, in which the optical strands (115) end with their optical fibers (119, 120), and which has a widening apparatus (114, 125, 131, 139, 139') on a second side, on which the beams emerge widened from the fibers (119, 120), the insert (112, 112'; 132, 138, 138', 142) including two separate partial elements (113; 114, 125, 131, 139, 139') which can be joined together, one of the two separate partial elements in the form of a widening apparatus (114, 125, 131, 139, 139') and the other of the two separate partial elements in the form of a holding block (113) for holding the ends of the optical strands (115), wherein the holding block (113) includes a strand hole (121) of a first diameter for each of the ends of the optical strands (115), which strand hole (121) extends into the holding block (113) on the first side and merges via an adjacent insertion cone (122) into a fiber hole (123) of a second diameter being substantially smaller than the first diameter, which ends on the opposite side of the holding block (113).

2. The optical plug connector of claim 1, wherein the holding block (113) and the widening apparatus (114, 125, 131, 139, 139') are matched to one another such that, when the insert (112, 112'; 132, 138, 138', 142) is joined together, the fibers (119) of the optical strand (115) ends which are held by the holding block (113) include a fiber section (120) of predetermined length which projects out of the holding block (113) and into the widening apparatus (114, 125, 131, 139, 139').

3. The optical plug connector of claim 1, wherein the strand holes (121) or the fiber holes (123) are arranged parallel to one another and in a plurality of rows one above the other in the holding block.

4. The optical plug connector of claim 1 wherein the widening apparatus (114, 125, 131, 139, 139') includes a first means (116; 129, 130; 133, 137, 137') for widening the beams which emerge from the optical strands (115), and a second means (124, 128) for holding and adjusting the fiber sections (120) which project out of the holding block (113) with respect to the first means (116; 129, 130; 133, 137, 137').

5. The optical plug connector of claim 4, wherein the first means comprise refractive optical elements, in particular in the form of lenses (116), spherical lenses (133) or GRIN lenses.

6. The optical plug connector of claim 4, wherein the first means comprise reflective optical elements, in particular in the form of mirror (137, 137') or parabolic mirrors (129, 130).

7. The optical plug connector of claim 4 wherein the second means comprise adjusting holes (124).

8. The optical plug connector of claim 4 wherein the second means comprise V-grooves (128).

9. The optical plug connector of claim 2, wherein the end surfaces of the fiber sections (120) which project out of the holding block (113) are laser-processed.

10. The optical plug connector of claim 1 wherein the insert (112, 112') is fitted into a housing (111).

11. A method for producing a plug connector (110, 110') as claimed in claim 1, comprising:
  exposing the optical fibers (119) over a predetermined length at the ends of the optical strands (115) which are associated with the plug connector;
  inserting the ends of the optical strands (115) with the exposed fibers (119) into the holding block (113) in a fixed position, such that a fiber section (120) of each of the exposed fibers (119) projects out of the holding block (113);
  processing the projecting fiber sections (120) by a laser cleaving process; and
  joining the holding block (113) with the ends of the optical cores strands (115) held in to a widening apparatus (114, 125, 131) that is provided to form an insert (112, 112'), and in that the insert (112, 112') is fitted into a housing (111).

12. The method of claim 11, wherein a widening apparatus (114, 125, 131, 139, 139') is used which comprises optical means (116; 129, 130; 133, 137, 137') for widening the beams which emerge from the optical strands (115), and in that the exposed fiber sections (120) are adjusted with respect to the optical means (116; 129, 130; 133, 137, 137') when the holding block (113) and the widening apparatus (114, 125, 131, 139, 139') are being joined together.

13. An optical plug connector system (100), comprising two optical plug connectors (110, 110') which are matched to one another and can be detachably connected to one another, wherein the two plug connectors (110, 110') are designed as claimed in claim 1.

14. The optical plug connector system of claim 13, wherein the inserts (112, 112') of the two plug connectors (110, 110') arc of the same type.

15. The optical plug connector system of claim 13 wherein the inserts (112, 112') of the two assembled plug connectors (110, 110') are aligned with one another with respect to the optical axes (136), and arc at a distance (a) from one another.

16. The optical plug connector system of claim 13 wherein the plug connectors (110, 110') can be latched to one another by a screw connection, a bayonet fitting or a sprung quick-action catch.

17. The optical plug connector system of claim 16 wherein the plug connectors (110, 110') can be latched to one another forming a seal.

* * * * *